US005175569A

United States Patent [19]

Chiba

[11] Patent Number: 5,175,569

[45] Date of Patent: Dec. 29, 1992

[54] METHOD OF AND APPARATUS FOR RECLAIMING INKED SHEETS

[75] Inventor: Noriyoshi Chiba, Suwa, Japan

[73] Assignee: Seiko Epson Corp., Tokyo, Japan

[21] Appl. No.: 645,583

[22] Filed: Jan. 24, 1991

[30] Foreign Application Priority Data

| | | | |
|---|---|---|---|
| Jan. 25, 1990 | [JP] | Japan | 2-15301 |
| Aug. 29, 1990 | [JP] | Japan | 2-227681 |
| Aug. 29, 1990 | [JP] | Japan | 2-227682 |
| Aug. 29, 1990 | [JP] | Japan | 2-227683 |
| Dec. 21, 1990 | [JP] | Japan | 2-405283 |

[51] Int. Cl.[5] ........................ G01D 15/06; B05D 1/04

[52] U.S. Cl. .................................. 346/153.1; 427/472

[58] Field of Search ........................ 346/153.1; 427/27

[56] References Cited

U.S. PATENT DOCUMENTS

| | | | |
|---|---|---|---|
| 4,467,332 | 8/1984 | Akutsu | 346/140 R |
| 4,942,056 | 7/1990 | Shimura et al. | 427/35 |

*Primary Examiner*—George H. Miller, Jr.

*Attorney, Agent, or Firm*—Ladas & Parry

[57] ABSTRACT

A method of and apparatus for reclaiming an inked sheet which includes a conductive ink layer formed on an insulating supporter, and in which the ink layer has transferred parts and untransferred parts remaining without being transferred; comprising the fact that an electrode (10 FIG. 1) is brought into contact with the insulating supporter (2), that conductive ink (7) to be introduced into the transferred parts (4) is conveyed to a position which confronts the electrode (10) with the inked sheet (1) intervening therebetween and which does not contact with the inked sheet (1), that a predetermined voltage is applied between the electrode (10) and the conductive ink (7), thereby to fly and supply the conductive ink (7) into each transferred part (4), and that the supplied conductive ink (7) in each transferred part (4) is fixed (14). Thus, the conductive ink (7) can be supplied without contacting with the inked sheet (1), and the supply of the conductive ink (7) need not be synchronized with the conveyance of the inked sheet (1).

12 Claims, 6 Drawing Sheets

METHOD OF AND APPARATUS FOR RECLAIMING INKED SHEETS

BACKGROUND OF THE INVENTION

1. Field of the Invention

The present invention relates to a method of and an apparatus for reclaiming inked sheets. More particularly, it relates to a method of and an apparatus for reclaiming inked sheets which are employed for delivering the picture outputs of a printer, a copying machine, a display device, a facsimile equipment, etc. and in each of which parts of an ink layer have been transferred.

2. Description of the Related Art

Inked sheets in each of which an ink layer is borne on a base layer, have been extensively employed for forming the pictures of a printer, etc. The ink layer of the inked sheet is transferred onto a picture forming medium, for example, paper away from the base layer by a process such as thermofusion or electric heating transfer. Since many information items to be formed as the pictures are characters or linear patterns, most of the ink layer of the inked sheet remains on the base layer without being transferred. It is accordingly desirable from the viewpoint of economy that the inked sheet whose ink layer has been partly transferred can be reclaimed.

Methods of reclaiming the inked sheet whose ink, layer has been partly transferred, have been proposed in SID, '85 Digest, pp. 143-145, the official gazette of U.S. Pat. No. 4,467,332, the official gazette of Japanese Patent Application Laid-open No. 295876/1989, and so on.

In particular, the method disclosed in the official gazette of Japanese Patent Application Laid-open No. 295876/1989 is an excellent method wherein only the transferred ink parts of the inked sheet can be selectively packed with powdery conductive ink by a simple construction.

With this method, however, an electrical conduction path must be established, and hence, a state in which the powdery conductive ink lies in contact with the inked sheet must be held during the packing operation. Consequently, the powdery conductive ink is normally in mechanical contact with the inked sheet, which has led to the possibility that the durability of the powdery conductive ink will be adversely affected. Besides, there has been the possibility that the ink will be supplied also to parts other than the transferred ink parts though slightly. Further, it has sometimes been necessary to dispose means for supplying the powdery conductive ink in synchronism with the movement of the inked sheet.

SUMMARY OF THE INVENTION

Accordingly, the present invention has for its object to provide a method of and apparatus for reclaiming an inked sheet in which conductive ink can be supplied to the inked sheet without having the former lie in contact with the latter.

Another object of the present invention is to provide a method of and apparatus for reclaiming an inked sheet in which conductive ink can be stuck selectively to only the parts of the inked sheet from which ink has been transferred ("transferred parts").

Still another object of the present invention is to provide a method of and apparatus for reclaiming an inked sheet in which the thickness of the ink layer of the inked sheet is held constant even when the inked sheet has been reclaimed a plurality of times.

In one aspect of performance of the present invention, a method of reclaiming an inked sheet which includes a conductive ink layer formed on an insulating supporter, and in which the ink layer has transferred parts and untransferred parts (parts from which ink has not been transferred); the method comprising:

(a) the step of bringing an electrode into contact with said insulating supporter, (b) the step of conveying conductive ink which is to be introduced into said transferred parts to a position which confronts said electrode with said inked sheet intervening therebetween and which does not contact said inked sheet, (c) the step of applying a predetermined voltage between said electrode and said conductive ink, thereby to induce said conductive ink to jump to and to be deposited on each said transferred part, and (d) the step of fixing the supplied conductive ink in each said transferred part.

In another aspect of performance of the present invention, an apparatus for reclaiming an inked sheet which includes a conductive ink layer formed on an insulating supporter, and in which the ink layer has transferred parts and parts remaining untransferred; the apparatus comprising:

(a) an electrode which lies in contact with said insulating supporter, (b) conveyance means for conveying conductive ink which is to be introduced into said transferred parts to a position which confronts said electrode with said inked sheet intervening therebetween and which does not contact said inked sheet, (c) charge injection means for applying a predetermined voltage between said electrode and said conductive ink, thereby to inject electric charges into said conductive ink, and (d) fixation means for fixing the supplied conductive ink in each said transferred part.

According to the present invention, the conductive ink is permitted to be supplied more selectively into the transferred parts of the ink layer of the inked sheet. Moreover, according to the present invention, the conductive ink is conveyed and supplied under the noncontacting state thereof with the inked sheet, so that the deterioration of the ink attributed to the mechanical contact thereof with the inked sheet can be prevented. Furthermore, in consequence of the noncontacting situation of the conductive ink and the inked sheet, a mechanism for synchronizing the supply of the conductive ink with the conveyance speed of the inked sheet is dispensed with, so that the method and apparatus of the present invention become simpler in construction.

PREFERRED EMBODIMENTS OF THE INVENTION

Methods of and apparatuses for reclaiming inked sheets according to the present invention will be outlined in conjunction with the embodiments thereof.

Figure 1:
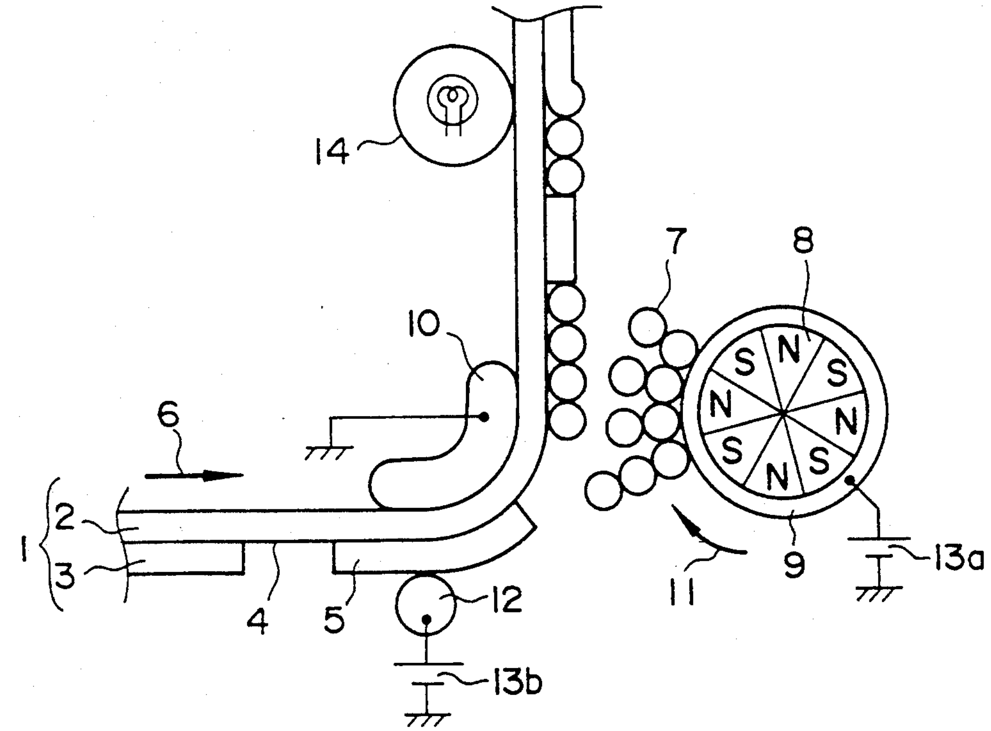
FIG. 1 shows an apparatus for reclaiming an inked sheet according to the present invention, which is an embodiment in the case of magnetic conductive ink.

In case of employing magnetic conductive ink:

FIG. 1 is a view schematically showing one embodiment of an apparatus for reclaiming an inked sheet according to the present invention, which is an example of a case where the conductive ink employed is magnetic conductive ink.

Referring to FIG. 1, an inked sheet 1 is constituted by an insulating supporter 2 and an ink layer 3. The inked sheet 1 has transferred parts 4 where the ink layer has been transferred by a thermal head or like printing means, and untransferred parts 5 where the ink layer has not been transferred. Conductive ink is packed into the transferred parts 4 by a method to be described below, whereby the inked sheet 1 is reclaimed.

First, the inked sheet 1 whose ink layer 3 has been partly transferred is conveyed in the direction of an arrow 6. Then, the inked sheet 1 is brought into contact with an electrode 10 at the insulating supporter 2 thereof.

At a position confronting the electrode 10, there are disposed means for conveying the conductive ink and means for injecting electric charges into the conductive ink.

In this embodiment, as the conveyance means, a conductive sleeve 9 which has a built-in magnet roller 8 magnetized into several pairs of magnetic poles is arranged with a certain spacing from the inked sheet 1. The conductive ink 7 being magnetic, which is to be packed into the transferred parts 4, is held on the sleeve 9 by a magnetic force. That is, a magnetic brush is formed on the sleeve 9 by the conductive ink 7. The conductive ink 7 is conveyed and supplied to the inked sheet side by rotating the sleeve 9 in the direction of an arrow 11 (alternatively, by rotating the magnet roller 8). Further, as the charge injection means, this embodiment is provided with a circuit for applying a predetermined voltage Va between the sleeve 9 and the electrode 10.

Here, regarding the form of the conductive ink 7, it is possible to apply any of powdery ink, pasty ink, ink in a fused or dissolved state, and ink in a semifused or semidissolved state, among which powdery ink is preferable. In the ensuing description, the use of powdery ink will be exemplified.

In the apparatus of FIG. 1, when the voltage Va is applied between the sleeve 9 and the electrode 10 by a power source 13*a*, the conductive ink 7 is induced to jump toward the transferred part 4 of the ink layer 3 of the inked sheet 1 by an electrostatic force, thereby to be supplied into the transferred part 4. It is a significant feature in the present invention that, on this occasion, the conductive ink 7 is formed as a single layer in the transferred part 4, thereby to replenish the part 4 at a fixed rate at all times. In contrast, the conductive ink 7 is not induced to jump and does not stick to the untransferred part 5 of the ink layer 3. The mechanism of the movement of the conductive ink 7 and the detailed mechanism of the formation of the single layer in the transferred part 4 will be described later.

The inked sheet 1 in which the conductive ink 7 has been thus stuck to the transferred part 4, is thereafter moved to the position of ink fixation means 14, by which the ink 7 is fixed onto the insulating supporter 2. The ink fixation means 14 is properly selected depending upon the property of the conductive ink to-be-used. By way of example, it is possible to apply any of methods known in the field of electrophotography, such as heated roll fixation, flash fixation and pressure fixation.

Figure 2:
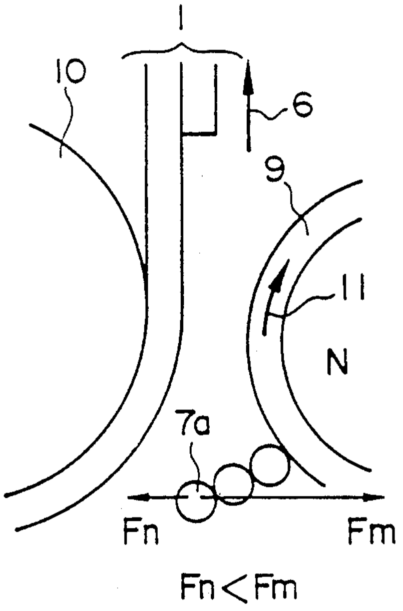
FIGS. 2(*a*) and 2(*c*) are diagrams for elucidating the principle on which the conductive ink jumps toward the transferred part of the inked sheet.
Figure 2:
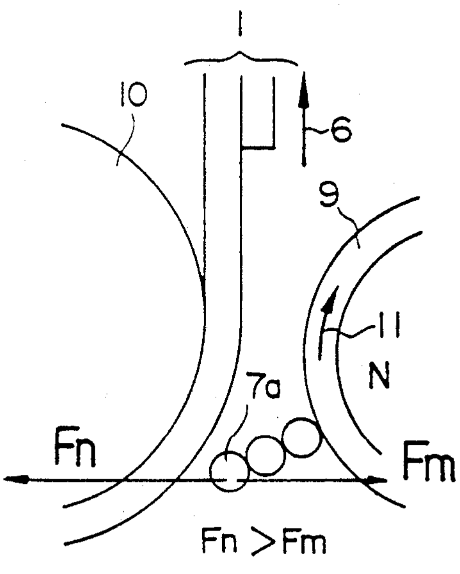
Figure 2:
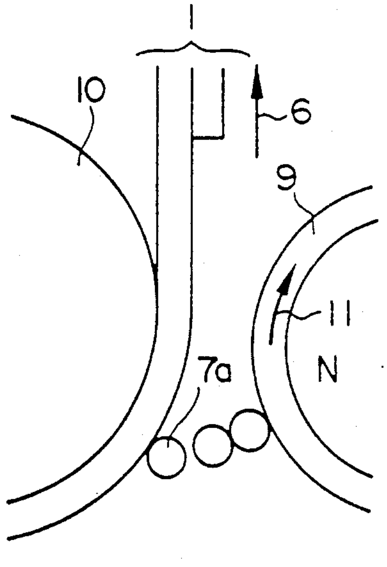

The reason why the conductive ink 7 jumps only to the transferred parts 4 of the inked sheet 1, is considered below. FIGS. 2(*a*) through 2(*c*) are views for elucidating the principle on the basis of which the conductive ink 7 is induced to jump toward the transferred part 4 of the inked sheet 1.

When the transferred part 4 of the inked sheet 1 has come to the interspace between the sleeve 9 and the electrode 10, the voltage Va is applied between these components 9 and 10. Then, current flows through the chain of the powder particles of the conductive ink 7 formed as the magnetic brush, and electric charges are injected into the conductive ink particle 7*a* lying at the fore end of the magnetic brush. When the charges have been injected, the conductive ink particle 7*a* is subjected to an electrostatic force Fn toward the inked sheet 1, and a magnetic restraint force Fm toward the sleeve 9, as illustrated in FIG. 2(*a*). Although the directions of the forces are set out as opposite in the illustration for brevity of description, strictly they differ depending upon a magnetic field established by the magnet roller 8 and the shape of the electrode 10. As the conductive ink particle 7*a* at the fore end of the magnetic brush is brought nearer to the inked sheet 1 by the conveyance of the sleeve 9, the amount of charge injected into the conductive ink particle 7*a* increases, and the electrostatic force Fn becomes greater accordingly. At the point of time at which Fn>Fm has held in due course as illustrated in FIG. 2(*b*), the conductive ink particle 7*a* is induced to jump toward the inked sheet 1. Herein, as a matter of fact, there is also a case where the spike of the magnetic brush lengthens toward the inked sheet 1, so the conductive ink particle 7*a* lying at the fore end of the magnetic brush reaches the inked sheet 1 without jumping. In the present invention, the expression "jump" shall also cover this case in the significance thereof. The conductive ink particle 7*a* having jumped and stuck to the transferred part 4 is shown in FIG. 2(*c*).

Meanwhile, even in a case where the untransferred part 5 of the inked sheet 1 has come to the interspace between the sleeve 9 and the electrode 10, the electrostatic force Fn acts on the conductive ink particle 7*a* at the fore end of the magnetic brush formed on the sleeve 9, and the conductive ink particle 7*a* jumps (or moves) toward the untransferred part 5 of the ink layer 3. Since, however, most of the charges of the conductive ink particle 7*a* are injected into the ink layer 3 upon the contact of the particle 7*a* with the layer 3, the electrostatic force Fn disappears, and the conductive ink particle 7*a* is drawn back to the sleeve 9 again. Accordingly, the conductive ink 7 does not stick to the ink layer 3, and only the transferred parts 4 of the ink layer 3 are selectively replenished with the conductive ink 7.

Now, the mechanism in which the conductive ink 7 supplied into the transferred part 4 forms a single layer, thereby to replenish this transferred part at a fixed rate at all times, will be described with reference to FIG. 1.

As illustrated in FIG. 1, the layer of the conductive ink 7 stuck to the insulating supporter 2 is initially formed on the transferred part 4 (hereinbelow, this layer shall be called the "first layer of conductive ink"). In a case where the conductive ink 7 has further jumped (or moved) toward the ink layer 3 (hereinbelow, the conductive ink on this occasion shall be called the "second layer of conductive ink"), the second layer of conductive ink comes into contact with the first layer of conductive ink. Then, most of the charges of the second layer of conductive ink are injected into the first layer of conductive ink. As a result, the first layer and the second layer of conductive ink become equipotential, so that the second layer of conductive ink loses an electrostatic force Fn toward the inked sheet 1. The conductive ink having lost the force Fn is drawn back to the sleeve 9 by a magnetic restraint force Fm. Accordingly, only one layer of the conductive ink 7 is stuck onto the part of the insulating supporter 2 corresponding to the transferred part 4, and this transferred part is replenished with the fixed rate of conductive ink at all times.

Further, this signifies that the thickness of the ink layer 3 to be reclaimed can be freely controlled by properly selecting the particle size of the conductive ink 7.

Moreover, according to a preferred embodiment of the present invention, charge pre-injection means for previously injecting electric charges into the untransferred part 5 is provided at a position which confronts the electrode 10 and which precedes the position for the supply of the conductive ink 7 from the sleeve 9. In the embodiment of FIG. 1, a pre-electrode 12 is arranged so as to come into contact with the ink layer 3. A voltage Vb can be applied between this electrode 12 and the electrode 10 by a power source 13*b*. When the voltage Vb is applied, the charges are injected into the untransferred part 5 of the ink layer 3 of the inked sheet 1. In a case where the untransferred part 5 with the charges injected therein has come to the interspace between the sleeve 9 and the electrode 10, an electric field acting between the sleeve 9 and the inked sheet 1 is weakened because the charges in a certain amount have already been injected into the ink layer 3. Herein, when the amount of charges to be injected into the untransferred part 5 is set at an appropriate value, charges in an amount satisfying the condition of $Fn>Fm$ are not injected into the conductive ink particle *7a* at the fore end of the magnetic brush. Thus, the provision of the pre-electrode 12 permits the conductive ink 7 to be supplied into the transferred part 4 of the inked sheet 1 more selectively.

Furthermore, according to a preferred embodiment of the present invention, the conductive ink 7 to be conveyed is turned into a thin layer and rendered uniform on the sleeve 9 by a method to be described below. When the conductive ink 7 on the sleeve 9 is in the form of the thin layer, the spacing between the sleeve 9 and the inked sheet 1 can be finely adjusted, and when the thickness of the layer of the conductive ink 7 is uniform, dispersion in the flights of conductive ink particles based on the voltage Va can be suppressed. As another advantage, when the conductive ink 7 is in the form of the thin layer, the distance between the inked sheet 1 and the sleeve 9 can be shortened, so that the conductive ink 7 can be packed into the transferred part 4 of the inked sheet 1 even with a lower voltage Va.

As practicable examples for forming the thin layer, there are mentioned (1) a method in which the conductive ink 7 is turned into a thin layer by the use of a blade, and (2) a method in which the conductive ink 7 is turned into a thin layer by adjusting a magnetic force for forming a magnetic brush.

Figure 3:
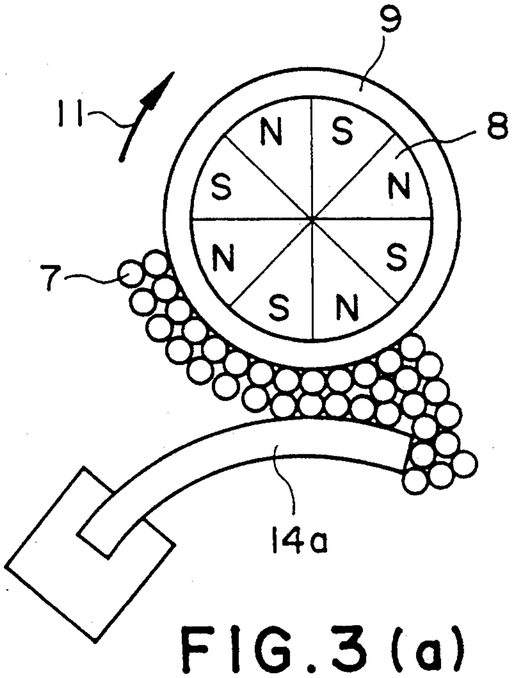
FIGS. 3(*a*) and 3(*b*) are diagrams each showing the operation of thinning a conductive ink layer with a blade.
Figure 3:
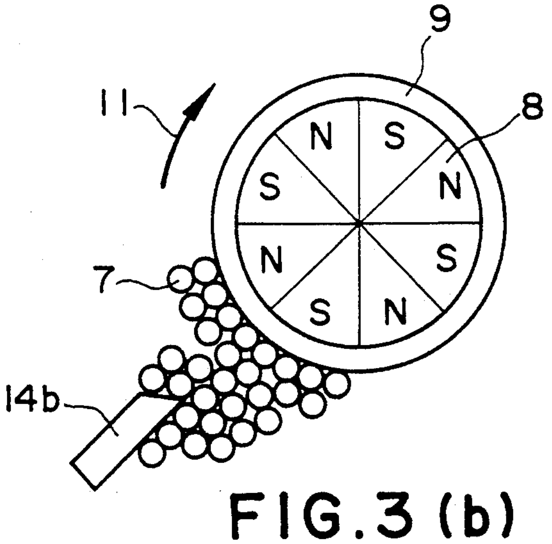

FIG. 3(*a*) shows an example in which the thin layer is formed using an elastic blade made of an elastic material. The elastic blade 14*a* is arranged so as to be pressed against the sleeve 9, thereby to constrain the conductive ink 7 into the thin layer. Used as the elastic blade 14*a* is, for example, a leaf spring or the like which is made of natural rubber, synthetic rubber (such as SBR, NBR, polysulfide type rubber, fluorinated rubber, silicone rubber or stereo rubber), plastics, a metal such as copper or stainless steel.

FIG. 3(*b*) shows an example in which the thin layer is formed using a magnetic blade. When the magnetic blade 14*b* is arranged as shown in the figure, the conductive ink particles are stuck thereto by a magnetic force. As a result, that spacing between the blade 14*b* and the sleeve 9 through which the conductive ink 7 can pass becomes narrow. Thus, the passing of the conductive ink can be regulated to form a thin layer. Further, the magnet roller 8 is fixed with its magnetic poles opposing to the magnetic blade 14*b*, and the sleeve 9 is rotated in the direction of an arrow 11 in order to convey the conductive ink 7. With this expedient, the amount of conveyance of the conductive ink 7 is regulated by the magnetic blade 14*b* at a position at which the spikes of the magnetic brush formed by the conductive ink 7 are erect, so that the thin layer can be formed more conspicuously. Used as the material of the magnetic blade 14*b* is, for example, a magnetic substance such as iron or nickel, or plastics in which the powder of the magnetic substance is mixed.

As described above, the conductive ink can be formed into the thin layer on the sleeve by the use of the blade. Besides, it is preferable that the surface of the sleeve is formed with minute rugged parts by sand blasting or the like. The reason is that the conductive ink is prevented from slipping on the sleeve and is turned into the thin layer more uniformly by the blade.

Figure 4:
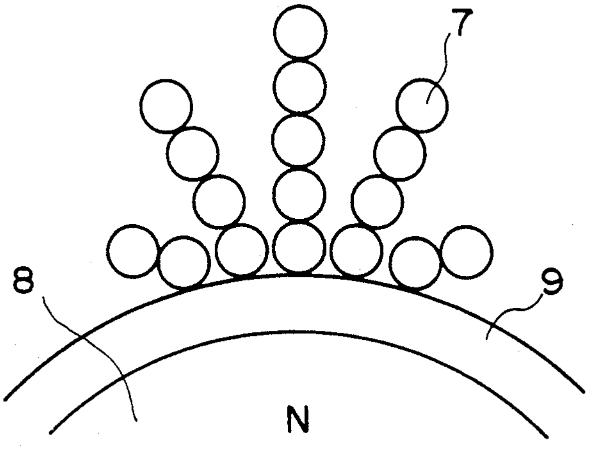
FIGS. 4(*a*) and 4(*b*) are diagrams each showing the situation of the spikes of a magnetic brush related to the position of a magnetic pole.
Figure 4:
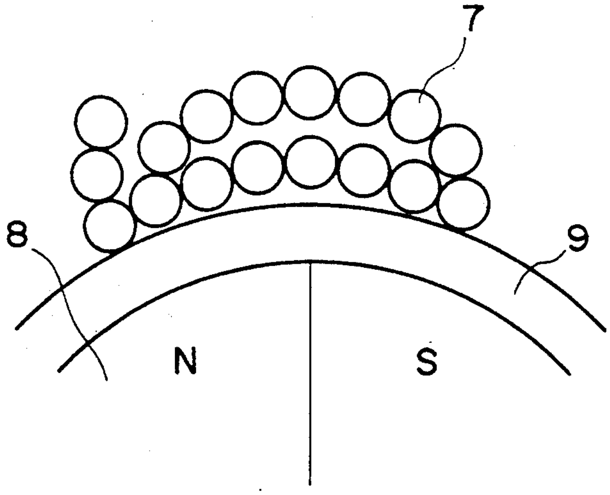

As the above method in which the conductive ink is turned into the thin layer by adjusting the magnetic force for forming the magnetic brush, there is mentioned, for example, a method which adjusts the position of the magnetic pole of the magnet roller within the sleeve. FIGS. 4(*a*) and 4(*b*) are views each showing the relationship between the position of the magnetic pole and the situation of the spikes of the magnetic brush. FIG. 4(*a*) illustrates the situation of the spikes of the magnetic brush of the conductive ink overlying the magnetic pole of the magnet roller, while FIG. 4(*b*) illustrates the situation of the spikes of the magnetic brush of the conductive ink lying astride the magnetic poles of the magnet roller. As seen from FIG. 4(*a*), the magnetic lines of forces are directed upright over the magnetic pole, the spikes of the magnetic brush stretch along the lines, and the heights of the spikes are greatly discrepant. On the other hand, as seen from FIG. 4(*b*), the magnetic lines of forces close astride the magnetic poles, so that the spikes are in a lying-down state in which the layer of the conductive ink is thin and in which the heights of the spikes are uniform. Accordingly, the conductive ink can be turned into the thin layer by fixing the magnet roller so that the portion of this roller striding over the magnetic poles may be at a position opposing to the inked sheet. Other examples are a method in which the magnetic force of the magnet roller is weakened to reduce the heights of the spikes, a method in which the pole pitch of the magnet roller is narrowed to lessen the leakage of the magnetic line of force and to reduce the heights of the spikes of the magnetic brush, and so on.

Incidentally, as another aspect of the foregoing embodiment, the means for injecting charges into the conductive ink may well be such that a voltage is applied between the blade 14*a* or 14*b* and the electrode 10, instead of the application of the voltage Va between the sleeve 9 and the electrode 10. Besides, charges may well be injected into the insulating supporter of the inked sheet by replacing the electrode 10 with an electrifier such as Corotron known in electrophotography.

Figure 5:
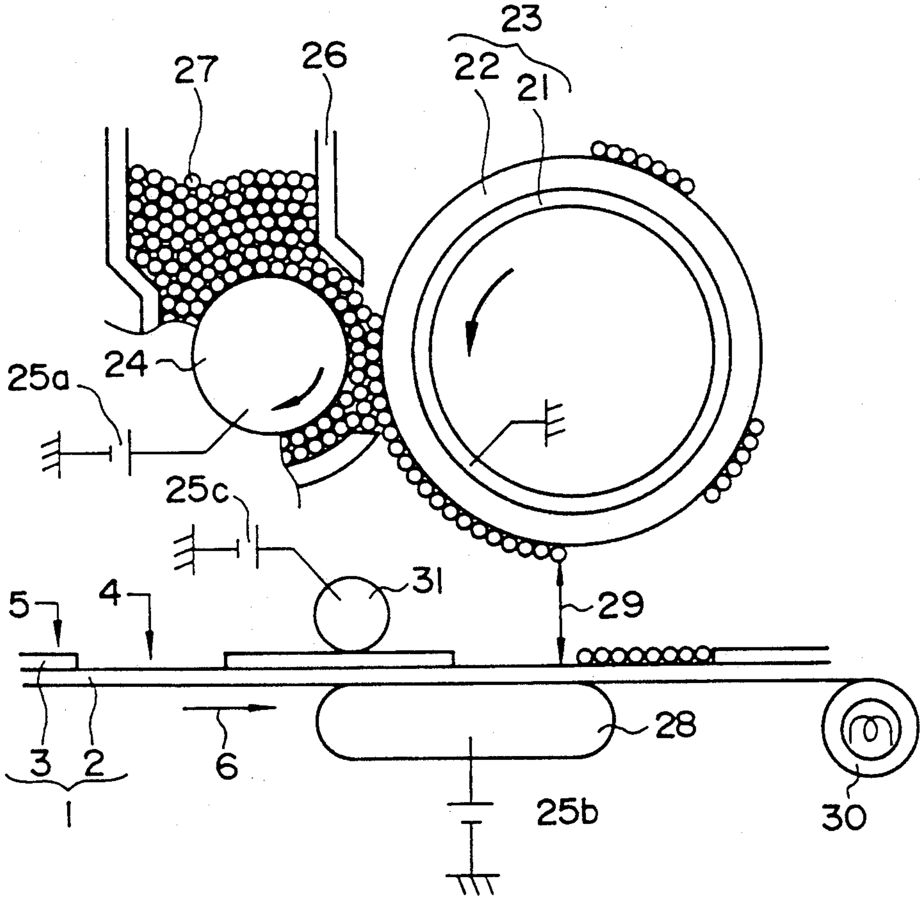
FIG. 5 shows an apparatus for reclaiming an inked sheet according to the present invention, which is an embodiment in the case of nonmagnetic conductive ink.

In case of employing nonmagnetic conductive ink:

FIG. 5 is a view schematically showing one embodiment of an apparatus for reclaiming an inked sheet according to the present invention, which is an example in the case where conductive ink employed is nonmagnetic conductive ink.

The apparatus in FIG. 5 differs greatly from the apparatus in FIG. 1 in that, since nonmagnetic conductive ink is employed, an electrode roller 24 and an intermediate roller 23, in which a dielectric layer 22 is stacked on a conductive layer 21, are adopted as conductive ink conveyance means instead of the sleeve having the built-in magnet roller. Further, as means for injecting electric charges into the conductive ink, a voltage Va is applied between the conductive layer 21 of the intermediate roller 23 and the electrode roller 24 by a power source 25*a*. Here, the intermediate roller 23 may have any construction comprising, at least, the dielectric layer 22 at the outer surface thereof, and the conductive layer 21 directly underlying the layer 22. Preferably, the dielectric layer 22 has a volume resistivity of or above $10^{12}$ Ω-cm and is made of, for example, fluoroplastios, polyester resin, polyamide resin, $SiO_2$, SiC or $Si_3N_4$. More preferably, it is made of a material less prone to wet with the conductive ink 27 (exhibiting a low wettability to the ink), for example, the fluoroplastics.

In the construction as stated above, when the voltage Va is applied, electrical conduction paths are established for the conductive ink 27 lying in the interspace between the intermediate roller 23 and the electrode roller 24, and electric charges are injected into the particles of the conductive ink 27 lying in contact with the dielectric layer 22 of the intermediate roller 23. On the other hand, the particles of the conductive ink 27 lying out of contact with the dielectric layer 22 act merely as the passages of the charges (electrical conduction paths), and they do not hold electric charges. The conductive ink particles 27 with the charges injected therein, are held in a thin-layer state on the intermediate roller 23 by electrostatic forces and are conveyed by this roller 23.

The inked sheet 1 is transported in the direction of an arrow 6. This inked sheet 1 has its insulating supporter 2 brought into contact with an electrode 28 at a position at which it confronts the intermediate roller 23. In addition, the intermediate roller 23 and the inked sheet 1 define a predetermined spacing (air gap) 29 at the position at which they confront the electrode 28. A predetermined voltage Vb is applied between the electrode 28 and the conductive layer 21 by a power source 25*b*. Herein, when the transferred part 4 of the ink layer 3 of the inked sheet 1 has come to the interspace between the intermediate roller 23 and the electrode 28, the conductive ink particles 27 on the intermediate roller 23 are induced to jump toward and deposited onto the transferred part 4. When this occurs, this embodiment has the significant feature that the conductive ink 27 is formed as a single layer in the transferred part 4, thereby to replenish this part 4 at a fixed rate at all times. In contrast, the conductive ink 27 does not jump and stick to the untransferred part 5 of the ink layer 3. The mechanism of the flight of the conductive ink 27 and the detailed mechanism of the formation of the single layer in the transferred part 4 will be described later.

The inked sheet 1 in which the conductive ink 27 has been thus stuck to the transferred part 4, is thereafter moved to the position of ink fixation means 30, by which the ink 27 is fixed onto the insulating supporter 2, in the same manner as in the apparatus of FIG. 1. Then, the inked sheet 1 is reclaimed.

The reasons why the conductive ink 27 jumps only to the transferred parts 4 of the inked sheet 1 and forms the single layer therein, are considered below. When the transferred part 4 of the inked sheet 1 has come to the interspace between the intermediate roller 23 and the electrode 28, electric charges $Q=Q_1-Q_2$ which are determined by the voltage Va, the voltage Vb, the capacitance of the dielectric layer 22, and the combined capacitance C of the insulating supporter 2 and the air gap 29 are injected into the conductive ink particle 27 lying on the intermediate roller 23 (in the above formula, $-Q_1$ denotes charges induced in the conductive layer 21 of the intermediate roller 23, and $Q_2$ denotes charges induced in the electrode 28). As a result, the conductive ink particle 27 on the intermediate roller 23 undergoes a restraint force f toward the intermediate roller 23 and an attractive force F toward the inked sheet 1 as are expressed by the following formulae:

$$f=k_1Q_1^2/d^2$$

$$F=k_2Q_2^2/D^2$$

where $k_1$ and $k_2$ denote constants, d denotes the thickness of the dielectric layer 22 calculated in vacuum, and D denotes the sum between the air gap 29 and the thickness of the insulating supporter 2 calculated in vacuum.

Here, when the values of the voltages Va and Vb, etc. are appropriately determined so as to hold $f<F$, the conductive ink particle 27 jumps to the transferred part 4 of the inked sheet 1. Onto the conductive ink layer thus formed (hereinbelow, called the "first layer of conductive ink"), a further conductive ink particle jumps (hereinbelow, called the "second layer of conductive ink"). However, when the second layer of conductive ink has come into contact with the first layer of conductive ink, most of the charges of the second layer of conductive ink are injected into the first layer of conductive ink. In this regard, when the values of the voltages Va and Vb are properly selected, the particle of the second layer of conductive ink 27 is drawn back to the intermediate roller 23 by a slight amount of charge remaining in the conductive ink particle 27. As a result, the single layer of the conductive ink is formed in the transferred part 4.

Meanwhile, even in a case where the untransferred part 5 of the inked sheet 1 has moved to the interspace between the intermediate roller 2 electrode 28, the conductive ink particle 27 jumps toward the inked sheet 1. However, when the conductive ink particle 27 has come into contact with the untransferred part 5 of the ink layer 3, most of the charges possessed by the conductive ink particle 27 migrate into the untransferred ink-layer part 5. In this regard, when the values of the voltages Va and Vb are properly selected, the conductive ink particle 27 is drawn back to the intermediate roller 23 by a slight amount of charge remaining in this ink particle 27.

Incidentally, the conductive ink particles not drawn back to the intermediate roller 23 remain in the untransferred part 5 and on the first layer of conductive ink in some cases. In such a case, the conductive ink particles in the clouded state should more preferably be drawn up by a suction nozzle or the like. Alternatively, the intermediate roller 23 may well be arranged under the inked sheet 1 so as to gravitationally recover the remaining conductive ink particles.

Further, according to a preferred embodiment of the present invention, charge pre-injection means for previously injecting electric charges into the untransferred part 5 is provided at a position which confronts the electrode 28 and which precedes the position for the supply of the conductive ink 27 from the intermediate roller 23. In the embodiment of FIG. 5, a pre-electrode 31 is arranged so as to come into contact with the ink layer 3. A voltage Vc can be applied between the electrode 28 and the electrode 31 by a power source 25c. When the voltage Vc is applied, the charges are injected into the untransferred part 5 of the ink layer 3 of the inked sheet 1. In a case where the untransferred part 5 with the charges injected therein has come to the interspace between the intermediate roller 23 and the electrode 28, an electric field acting between the intermediate roller 23 and the inked sheet 1 is weakened because the charges in a certain amount have already been injected into the ink layer 3. Herein, when the amount of charges to be injected into the untransferred part 5 is set at an appropriate value, charges in an amount satisfying the condition of the restraint force f<the attractive force F are not injected into the conductive ink particle 27 on the intermediate roller 23. Thus, the provision of the pre-electrode 31 permits the conductive ink 27 to be supplied into the transferred part 4 of the inked sheet 1 more selectively.

By the way, although the above embodiment is favorably applied to the case of nonmagnetic conductive ink, obviously it is applicable even when conductive ink is magnetic.

The inked sheet to which the reclaiming method of the present invention is applicable, may have any construction wherein, at least, a conductive ink layer and an insulating layer (dielectric layer) are formed in adjacency. Accordingly, the inked sheet may well be constructed of such a structure of three or more layers that one or more among a conductive layer, a heat-resisting layer, a lubrication layer, etc. is/are disposed on the side of the electrode 10 or the electrode 28 in either of the foregoing embodiments. The present invention is applied to the inked sheet as stated above, which has been used for a picture output operation and whose ink layer has consequently been partly transferred to fall off, and it reclaims the used inked sheet.

Now, experimental examples will be described.

EXAMPLE 1 (PREPARATION OF CONDUCTIVE INK)

Conductive ink 7 was prepared as explained below. Parent particles were produced by dry pulverization, and they consisted of 16 weight-% of polystyrene, 30 weight-% of paraffin wax, 10 weight-% of carnauba wax, 4 weight-% of carbon black and 40 weight-% of $Fe_3O_4$. Subsequently, each of the particles was externally formed with carbon black by a mechanochemical process. Then, the particles of the conductive ink 7 having a volumetric average particle size of 10 μm were prepared.

EXAMPLE 2 (DETERMINATION OF APPLIED VOLTAGE VA)

In the apparatus illustrated in FIG. 1, the applied voltage Va was determined as stated below. By the way, the surface magnetic-flux density of the sleeve 9 was set at 420 G, and the inked sheet 1 was substituted by a film of polyethylene terephthalate (PET) which was 6 μm thick. The other conditions of the apparatus were as follows:

Distance between Sleeve and Nonmagnetic blade 14b
0.3 mm
Distance between Sleeve and Electrode 10
0.7 mm
Peripheral speed of Sleeve
20 cm/sec
Transportation speed of PET film
3 cm/sec The conductive ink obtained in Example 1 was employed, and the voltage Va between the sleeve 9 and the electrode 10 was varied, thereby to investigate the relationship between the voltage Va and the amount of the ink deposited to the PET film.

Figure 6:
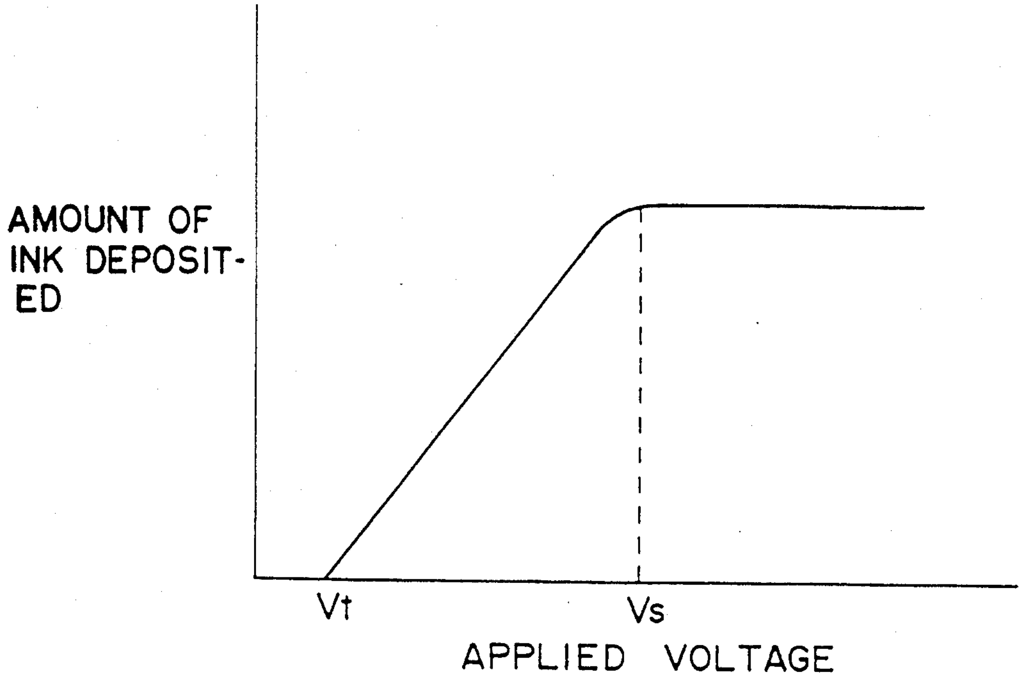
FIG. 6 is a graph showing the relationship between an applied voltage in the apparatus of FIG. 1 and the amount of the ink deposited.

The outline of a result is shown in FIG. 6. As seen from the figure, the ink began to deposit at 50 V (=deposition start voltage: Vt), and the amount of deposition increased with rise in the applied voltage Va. However, when the applied voltage Va exceeded 200 V (=deposition saturation voltage: Vs), the amount of deposition was saturated. The situation of the deposition of the ink at the deposition saturation voltage Vs was observed with a microscope. Then, the conductive ink stuck as only one layer.

Further, a similar experiment was conducted by holding the electrode 12 in contact with the PET film and applying 250 V as the voltage Vb. Then, a result similar to the foregoing was obtained.

EXAMPLE 3 (DETERMINATION OF APPLIED VOLTAGE VB)

Under the same apparatus conditions as in Example 2 except that an inked sheet whose ink layer was partly transferred away by the formation of pictures was employed instead of the PET film, the inked sheet was reclaimed while the applied voltage Va and the voltage Vb were varied.

Then, when the voltage Vb lay within a range:

$$Va - Vt \leqq Vb \leqq Va - Vt$$

the conductive ink flew to only the transferred parts of the inked sheet without flying to the untransferred parts thereof. Further, when the voltage Vb lay within a range:

$$Va - Vt \leqq Vb \leqq Va$$

the conductive ink was packed even into the vicinities of the boundaries between the transferred parts and untransferred parts of the inked sheet, as one layer without forming clearances.

In some cases, an electric field near the boundary between the transferred part and the untransferred part is closed by the electric charges injected into the ink layer beforehand, with the result that the conductive ink becomes difficult of sticking into the vicinity of the boundary. However, when the voltages Va and Vb are in the relation of Vb≦Va, the tendency of the electric field to be closed will be preventable.

EXAMPLE 4 (DETERMINATION OF DISTANCE BETWEEN SLEEVE AND ELECTRODE)

The relations of the distance between the sleeve 9 and the electrode 10, with the deterioration of the conductive ink and the movement thereof to the transferred part of the inked sheet, were investigated as stated below.

In the same apparatus as in Example 2, under the state under which the PET film was stopped and under which the voltage Va was not applied, the sleeve 9 was rotated for 10 hours while the distance between this sleeve 9 and the electrode 10 was varied. Incidentally, the following apparatus conditions were set:

Distance between Sleeve and Nonmagnetic blade
0.3 mm
Peripheral speed of Sleeve
40 cm/sec After 10 hours, the situation of the deterioration of the conductive ink, namely, the presence or absence of the flocculation of the conductive ink was observed. The results of the observation are listed in Table 1. In the table, mark "○" indicates that the flocculation was not noted, whereas mark "x" indicates that the flocculation was noted.

In addition, the widths of contact (the nips) between the PET film and the conductive ink held on the sleeve 9 were compared between in a case where the voltage Va was not applied and in a case where 250 V was applied as the voltage Va. Then, when the distance between the sleeve 9 and the electrode 10 was 0.4 mm or less, the nips in both the cases agreed (that is, the conductive ink was not induced to jump even when the voltage was applied). In contrast, when the distance between the sleeve 9 and the electrode 10 was 0.5 mm or greater, it could be verified that the nip was clearly widened by the movement of the conductive ink in the case of applying 250 V as the voltage Va, as compared with the nip in the case of applying no voltage. In the table, mark "○" in the column of the presence or absence of induction indicates that the induction of the conductive ink to jump was acknowledged at the application of 250 V as the voltage Va, whereas mark "x" indicates that induction was not acknowledged. Besides, the nips in the case where the voltage Va was not applied are indicated for reference in Table 1.

TABLE 1

| Distance | Situation of Deterioration | Presence or Absence of enduation | Nip (Va = 0) |
|---|---|---|---|
| 0.3 | x | x | 4 |
| 0.4 | x | x | 2 |
| 0.5 | ○ | ○ | 1 |
| 0.6 | ○ | ○ | 0.5 |
| 0.7 | ○ | ○ | 0 |
| 0.8 | ○ | ○ | 0 |
| 0.9 | ○ | ○ | 0 |
| 1.0 | ○ | ○ | 0 |
| 1.1 | ○ | ○ | 0 |
| 1.2 | ○ | ○ | 0 |

It is understood from Table 1 that, under the condition under which the conductive ink is applied to the film without being induced to jump in the case of applying the voltage Va, the conductive ink is liable to deteriorate. The deterioration will be ascribable to the collision of the conductive ink with the film. It is also understood that the deterioration of the ink does not take place when the nip is 1 mm or less in the state in which the voltage Va is not applied. By the way, the nip being 0 mm signifies the state in which the magnetic brush of the conductive ink is out of contact with the inked sheet at all times.

EXAMPLE 5 (EFFECT OF MAGNETIC BLADE)

In the same apparatus as in Example 2, the effects of a magnetic blade and a nonmagnetic blade in an identical shape were compared.

In the state in which the same PET film as in Example 2 was stopped, the sleeve 9 was rotated under apparatus conditions indicated below. Incidentally, the voltage Va was not applied.

Distance between Sleeve and Blade
0.2 mm
Distance between Sleeve and Electrode 10
0.2 mm
Peripheral speed of Sleeve
20 cm/sec With the magnetic blade, even when the sleeve was rotated for 20 hours, the flocculation of the conductive ink was not observed, and the deterioration of the ink was not noticed. On the other hand, with the nonmagnetic blade, the flocculation of the conductive ink was observed in 10 hours. Further, flocculent matter on that occasion filled up the interspace between the sleeve and the blade, and the defective conveyance of the conductive ink occurred. The deterioration of the conductive ink will be ascribable to the collision thereof with the PET film. That is, the layer of the conductive ink will not be sufficiently thinned by the nonmagnetic blade.

EXAMPLE 6 (RECLAMATION OF INKED SHEET)

Using the same apparatus as in Example 2, and under apparatus conditions indicated below, the inked sheet was reclaimed. Thereafter, the reclaimed inked sheet was used for printing with a thermal head and was reclaimed again. These steps were repeatedly carried out. Incidentally, the conductive ink was not turned into the thin layer by the magnetic blade.

Distance between Sleeve and Nonmagnetic blade
0.3 mm
Distance between Sleeve 9 and Electrode 10
0.7 mm
Peripheral speed of Sleeve
20 cm/sec Transportation speed of Inked sheet
9 cm/sec
Voltage Va
250 V
Voltage Vb
0 V As a result, the inked sheet whose ink layer had a constant thickness at all times could be obtained every reclamation.

EXAMPLE 7 (RECLAMATION OF INKED SHEET)

In the same apparatus as in Example 6, the voltage Va and the voltage Vb were respectively set at 250 V and 220 V, whereupon the repeated reclamation of the inked sheet similar to that of Example 6 was performed.

As a result, likewise to Example 6, the inked sheet whose ink layer had a constant thickness at all times could be obtained every reclamation.

EXAMPLE 8 (RECLAMATION OF INKED SHEET)

In the same apparatus as in Example 6, the reclamation of the inked sheet similar to that of Example 6 was performed while the conductive ink was being turned into the thin layer by the magnetic blade. Herein, apparatus conditions were as follows:

Distance between Sleeve 9 and Blade
0.2 mm
Distance between Sleeve and Electrode 10
0.2 mm
Peripheral speed of Sleeve
10 cm/sec
Transportation speed of Inked sheet
3 cm/sec
Voltage Va
150 V
Voltage Vb
120 V As a result, likewise to Example 6, the inked sheet whose ink layer had a constant thickness at all times could be obtained every reclamation.

What is claimed is:

1. A method of reclaiming an inked sheet which includes a conductive ink layer formed on an insulating supporter, the ink layer having transferred parts from which ink has been depleted, and untransferred parts having ink which has not been depleted, the method comprising the steps of:

bringing an electrode into contact with said insulating supporter of said inked sheet, conveying conductive ink which is to be introduced into said transferred parts to a first position where said conductive ink confronts said electrode with said inked sheet intervening between said conductive ink and said electrode and with said conductive ink spaced from said inked sheet without contacting it, and applying a predetermined voltage between said electrode and said conductive ink, thereby to induce the conductive ink to jump to and to be deposited on each of said transferred parts.

2. A method of reclaiming an inked sheet as in claim 1, further comprising the step of fixing the deposited conductive ink in each said transferred part.

3. A method of reclaiming an inked sheet as in claim 1, further comprising the step of applying a voltage between said insulating supporter and each of said untransferred parts at a second position which confronts said electrode and precedes said first position for introducing said conductive ink, thereby to inject electric charges into each of said untransferred parts.

4. A method of reclaiming an inked sheet as in claim 1, wherein said conductive ink is magnetic conductive ink.

5. A method of reclaiming an inked sheet as in claim 1, wherein said conductive ink is nonmagnetic conductive ink.

6. An apparatus for reclaiming an inked sheet which includes a conductive ink layer formed on an insulating supporter, the ink layer having transferred parts from which ink has been depleted, and untransferred parts having ink which has not been depleted, the apparatus comprising:

an electrode which lies in contact with said insulating supporter, conveyance means for conveying conductive ink which is to be introduced into said transferred parts to a first position where said conductive ink confronts said electrode with said linked sheet intervening between said conductive ink and said electrode, and with said conductive ink spaced from said inked sheet without contacting it, and charge injection means for applying a predetermined voltage between said electrode and said conductive ink to inject electric charge into said conductive ink when said conductive ink is in said first position thereby to cause said conductive ink to be deposited onto each of said transferred parts.

7. An apparatus for reclaiming an inked sheet as in claim 6, further comprising fixation means for fixing deposited conductive ink into each of said transferred parts.

8. An apparatus for reclaiming an inked sheet as in claim 6, further comprising pre-voltage application means for applying a voltage between said insulating supporter and each of said untransferred parts, thereby to inject electric charge into each of said untransferred parts at a second position which confronts said electrode and precedes said first position for introducing said conductive ink.

9. An apparatus for reclaiming an inked sheet as in claim 6, wherein said conductive ink is magnetic conductive ink.

10. An apparatus for reclaiming an inked sheet as in claim 9, wherein said conveyance means comprises a sleeve including a magnet roller therein.

11. An apparatus for reclaiming an inked sheet as in claim 6, wherein said conductive ink is nonmagnetic conductive ink.

12. An apparatus for reclaiming an inked sheet as in claim 11, wherein each conveyance means comprises a rotatable roller which includes a dielectric layer stacked on a conductive layer, and means for applying a voltage between said conductive layer and said conductive ink on said roller.

* * * * *